Patented May 26, 1942

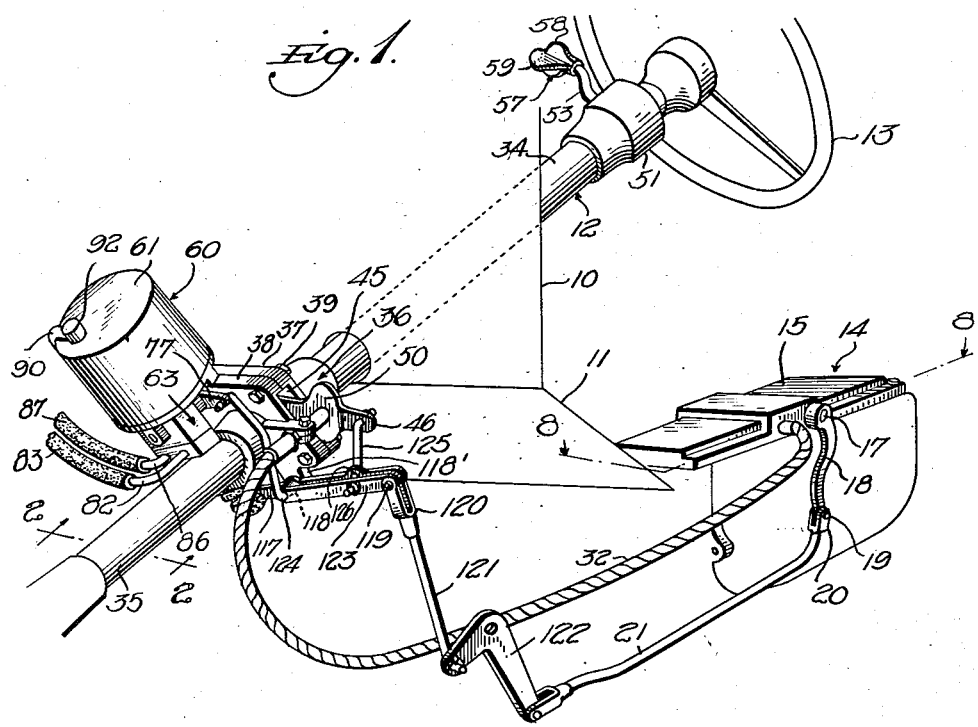
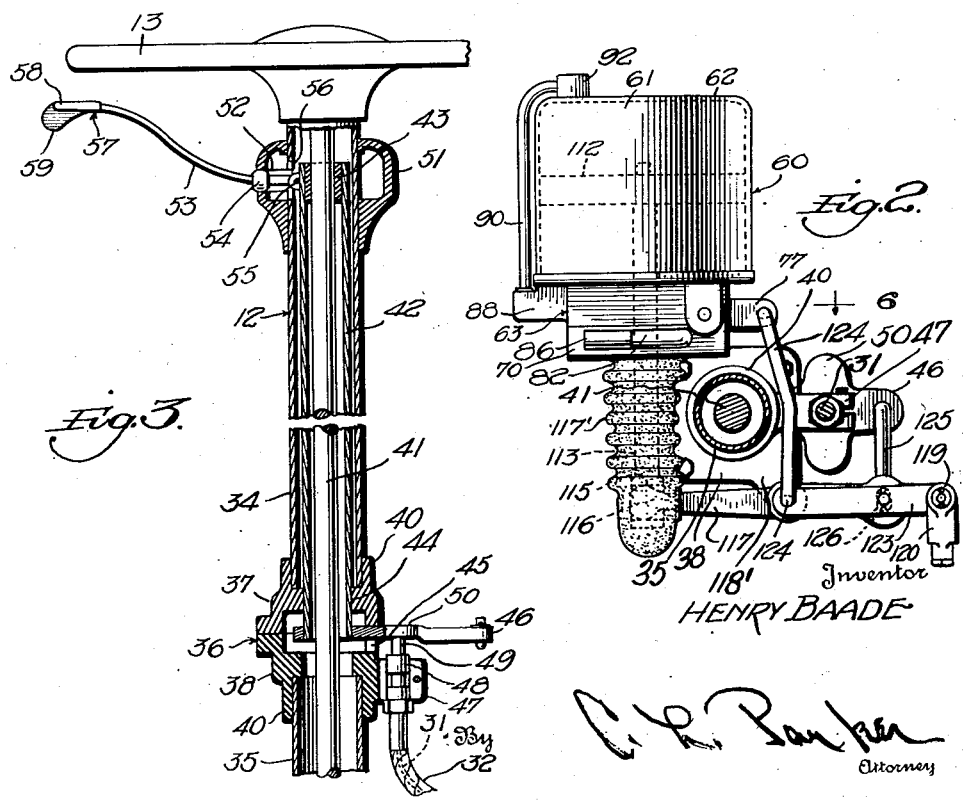

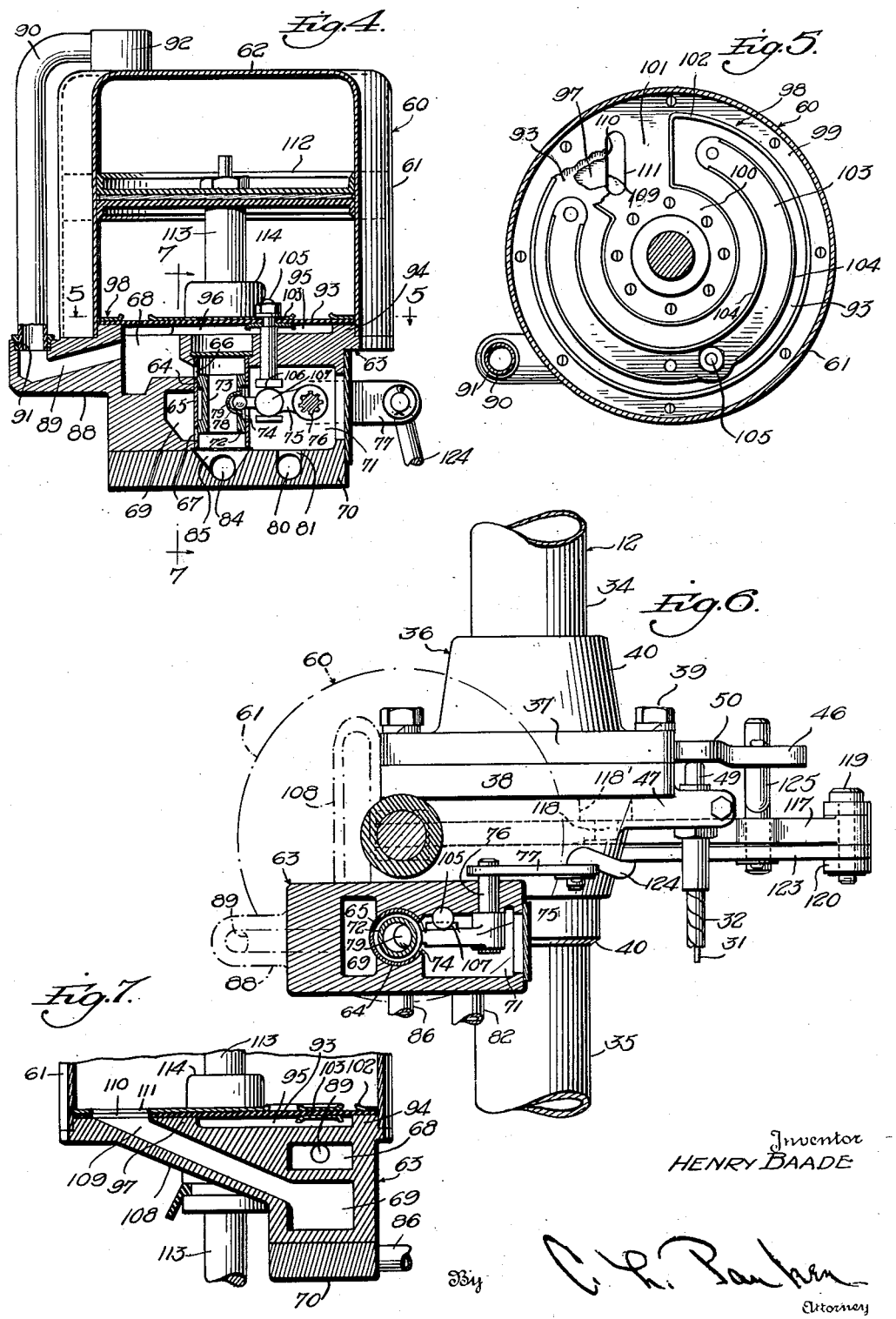

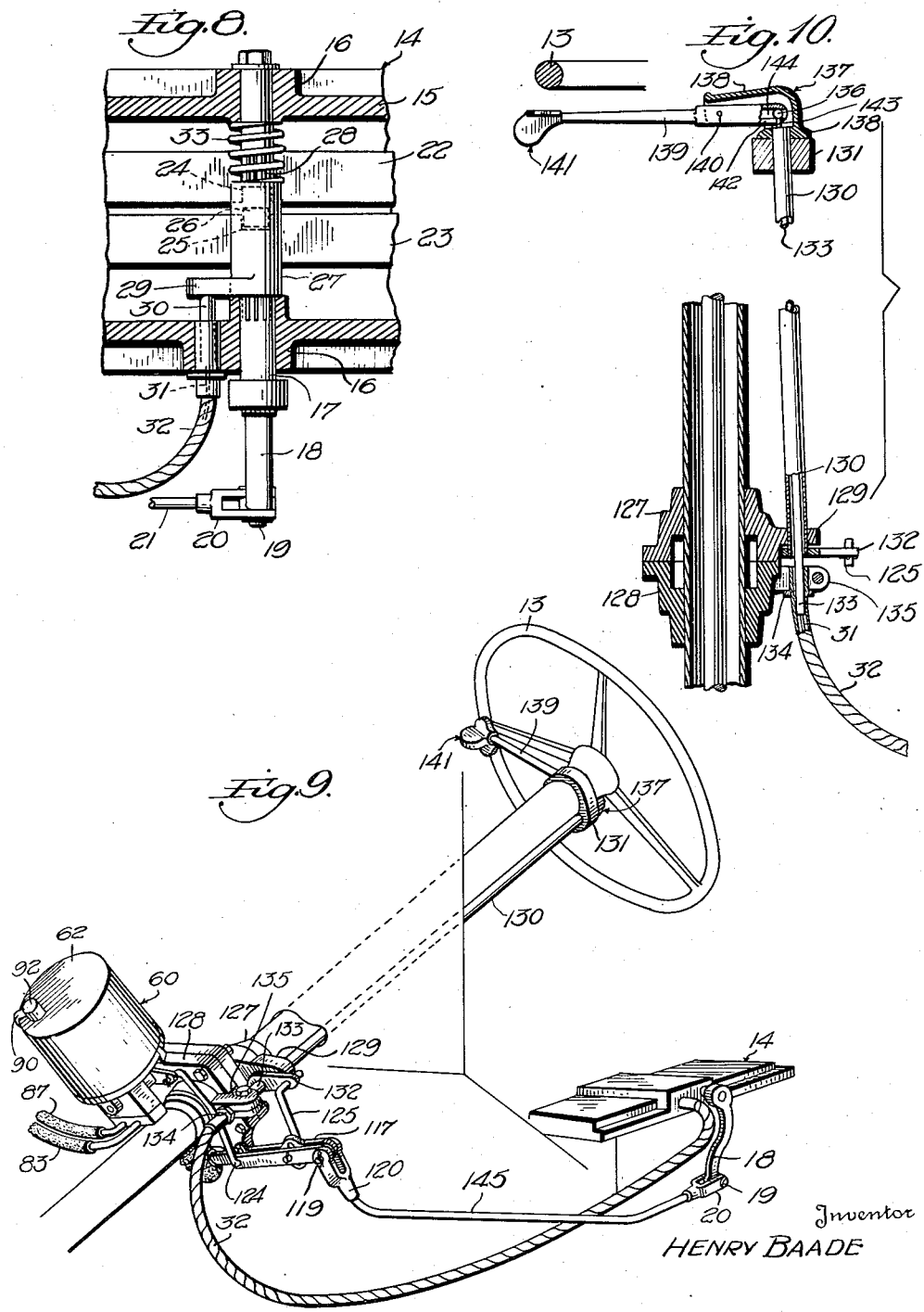

2,284,246

UNITED STATES PATENT OFFICE 2,284,246

GEAR SHIFTING MECHANISM

Henry Baade, Detroit, Mich., assignor to Automatic Shifters, Inc., Richmond, Va., a corporation of Virginia Application June 8, 1938, Serial No. 212,591

21 Claims. (Cl. 74—335)

This invention relates to power operated gear shifting mechanisms for motor vehicles.

In the copending application of Henry W. Hey, Serial No. 169,288, filed October 15, 1937, there is disclosed a vacuum operated gear shifting mechanism for motor vehicles wherein a novel control valve mechanism controls communication of the shifting motor with the atmosphere and the intake manifold to provide the various shifting movements. The valve mechanism is controlled by a suitably located manually operable handle and by the operation of the motor to provide a follow-up action whereby the shifting movement takes place to a degree proportional to the degree of movement of the handle. A fluid pressure operated device is connected to be influenced by pressures in opposite ends of the shifting motor and is arranged to utilize such pressures for creating resistance to the movement of the handle whereby the latter is provided with the highly desirable "feel" to assist the operator in properly performing the gear shifting operations.

In my copending application Serial No. 287,844, filed May 13, 1938, I have disclosed and claimed a gear shifting mechanism which embodies the principles of operation of the copending application of Henry W. Hey, referred to above, the mechanism being highly simplified by embodying the control valve mechanism in one of the heads of the shifting motor. Moreover, the reaction device by means of which the manually operable handle is provided with "feel" is arranged between the shifting motor cylinder and the head thereof to be influenced by pressures in opposite ends of the shifting motor. Such arrangement eliminates the separate fluid pressure reaction device, and the mechanism as a whole is not only simplified, but is so materially reduced in size as to facilitate its installation in many motor vehicles, the space available for a shifting mechanism being quite limited in most vehicles.

While the mechanism of my copending application is such as to facilitate its installation in many motor vehicles in which such installation is difficult if not impossible with other constructions, it has been found that even such a simplified mechanism cannot be installed in some present motor vehicles, and vehicle structures which are now being designed for future manufacture. This is due to the fact that space is even further limited in such vehicles because of the character of the engine mountings, the placing of the hand brake control cable, the arrangement of over-drive control mechanisms, etc.

Moreover, motor vehicle manufacturers are becoming increasingly aware of the desirability of eliminating the conventional gear shift lever from the floorboards and to this end several vehicles are now equipped with manual gear shift levers mounted beneath and movable parallel to the planes of the steering wheels, and other motor vehicles embodying the same feature are now in the process of design and manufacture. While such manually shiftable mechanisms are highly desirable over the use of gear shift levers projecting upwardly from the floorboards, they are objectionable for other reasons. In the first place, more force for performing a shifting movement is necessary because of the additional resistances to the shifting operations introduced because of the mechanical connections such as links, levers, etc. through which movement of the gear shifting handle is transmitted to the gear set. Moreover, the gear shift levers partake of a substantial movement and accordingly it is difficult to reach around the steering wheel a sufficient distance to perform the shift into second gear.

An important object of the present invention is to provide a gear shifting mechanism wherein the advantages of my copending application referred to are embodied in a shifting motor and its control mechanism and wherein the shifting mechanism may be mounted adjacent to and supported with respect to the steering column instead of being arranged adjacent the gear set where insufficient space may be available.

A further object is to provide a mechanism of this character wherein a follow-up valve mechanism is provided for the shifting motor and wherein the motor, the valve mechanism and the manual control means for the latter are all compactly arranged in association with the steering column.

A further object is to provide a novel combination of valve operating and controlling levers and associated parts with the steering column in a particularly efficient arrangement wherein a minimum amount of space is required for the parts.

A further object is to provide a novel mechanism of this character which may be readily employed in connection with manual shifting mechanisms having operating handles arranged adjacent the steering wheel and wherein the changeover from manual to power shifting may be very easily accomplished by the simple substitution of the present mechanism for one of the parts of a manual shifting mechanism of the character referred to.

A further object is to provide a shifting mechanism adapted to be connected into a manual shifting mechanism which includes a shifting crank projecting laterally from the steering column beneath the floorboards and wherein the motion transmitting means usually connected to such crank is eliminated in favor of a valve operating link forming a part of the present mechanism, such link being arranged at one side of the steering column and the shifting motor arranged adjacent the other side of the steering column, and these elements being connected beneath the steering column, thus minimizing the space required for the apparatus as well as simplifying its installation in changing-over from a manual to a power shifting mechanism.

Other objects and advantages of the invention will become apparent during the course of the following description.

In the drawings I have shown two embodiments of the invention. In this showing:

Figure 1 is a perspective view of the mechanism associated with certain parts of a motor vehicle, the view being taken looking toward the rear of the vehicle, Figure 2 is a transverse sectional view taken at right angles to the steering column and looking toward the lower end thereof, the plane of section being approximately as indicated by the line 2—2 in Figure 1, Figure 3 is an axial sectional view through a portion of the steering column, parts being shown in section and parts being broken away.

Figure 4 is a longitudinal sectional view through the shifting motor and associated parts, the plane of section being parallel to the axis of the motor and taken through the axis of the control valve, Figure 5 is a section on line 5—5 of Figure 4, Figure 6 is a section on line 6—6 of Figure 2, certain of the motor parts being shown in broken lines, Figure 7 is a fragmentary sectional view on line 7—7 of Figure 4, Figure 8 is a horizontal fragmentary sectional view taken approximately on the horizontal plane indicated by line 8—8 of Figure 1, showing a portion of the selecting means associated with the transmission, Figure 9 is a perspective view similar to Figure 1 showing a slightly modified form of the invention, and, Figure 10 is a fragmentary sectional view through a portion of the steering column showing the modified form of control handle mechanism associated therewith.

Referring to Figure 1 the numeral 10 designates the dash or bulkhead of a motor vehicle at the lower end of which is arranged the sloping floorboards 11 at the front of the driver's compartment, these parts being illustrated to assist in an understanding of the location of the parts of the apparatus. The vehicle is provided with a steering column indicated as a whole by the numeral 12 and provided at its upper end with a steering wheel 13. A motor vehicle engine and clutch (not shown) deliver power through a gear set indicated as a whole by the numeral 14 to drive the vehicle in the usual manner.

In Figure 8 a suitable mechanism is illustrated as being associated with the gear set for selecting either shift rail for actuation and for transmitting an actuating force thereto. This mechanism may be of any desired type and accordingly has not been illustrated in detail. As shown in Figure 8, the gear set may be provided with a cover plate 15 having bearings 16 at opposite sides rotatably supporting a shaft 17. This shaft is provided at one end with a depending crank 18 pivotally connected at its free end as at 19 to a yoke 20 carried by the rear end of a rod 21.

Within the gear set are the usual low and reverse gear shift rail 22 and second and high gear shift rail 23, and such shift rails are respectively notched as at 24 and 25 to selectively receive a depending crank 26 carried by a sleeve 27 splined as at 28 on the shaft 17. Adjacent one end, the sleeve 27 is provided with a lateral extension 29 engageable by a pin 30 connected to one end of a Bowden wire 31 operating in a flexible tube 32. Between the opposite end of the sleeve 27 and the corresponding side of the cover plate 15 a compression spring 33 surrounds the shaft 17 and urges the sleeve 27 in the direction of the pin 30.

It will be apparent that the spring 33 biases the finger or crank 26 into engagement with the notch 25 of the second and high gear shift rail 23 and that the transmission of a force to the member 29 by the pin 30 will slide the sleeve 27 against the tension of the spring 33 to arrange the finger 26 in notch 24 and thus select the low and reverse gear shift rail 22 for actuation. It will be apparent that since the sleeve 27 is splined on the shaft 17, turning movement of such shaft will cause the finger 26 to actuate either shift rail, depending upon the notch with which it is in engagement. As stated, the structure shown in Figure 8 is not essential per se to the operation of the present invention since any desired type of selecting and shifting mechanism may be employed in conjunction with the gear set. The mechanism in Figure 8, however, is used in conjunction with the gear sets of certain motor vehicles which are provided with manually operable means for actuating the pin 30 and crank 18, and in which mechanisms the present invention is particularly adapted to be used to provide power instead of manual shifting.

In Figures 1 and 2 the steering column is shown as being of the general type employed with the manual shifting mechanism referred to. It will be noted that the steering column is formed of a pair of sections 34 and 35 arranged in axial alignment with their ends in spaced relation. These column sections are connected by a two-part casting 36 comprising upper and lower parts 37 and 38. These parts have their adjacent edges bolted together as at 39 and each is cylindrically flanged as at 40 to receive the adjacent end of the associated steering column section. The steering post 41 is arranged axially of the steering column and is connected to the steering wheel in the usual manner.

A tubular actuating member 42 is arranged concentrically within the steering column and surrounds the post 41. The upper end of the tubular member 42 is provided with an internal bearing 43 surrounding the steering post, while the lower end of the tubular member 42 is rotatably supported in a bearing 44 formed integral with the section 37. At one side of the steering column, an opening 45 is formed between the casting sections 37 and 38 and a crank arm 46 projects outwardly through this opening. The free end of this arm, in the manually shiftable mechanism previously referred to, is connected to an element forming a part of a motion transmitting means for effecting movement of the selected shift rail. In the present construction, however, the free end of the crank arm 46 is employed for operating a valve mechanism, as will be described in detail later.

The cast member 38 is provided with a split extension 47 in which is slidably mounted a member 48 having a button 49 at its end engageable with one face of the crank arm 46, such portion of the crank arm being materially widened as at 50 to provide a broad bearing face for the button 49 which will remain in engagement therewith in any position of the crank arm 46, as will become apparent. The slidable member 48 is connected to one end of the Bowden wire 31 previously described, the flexible casing 32 for the Bowden wire being connected to the member 47 as shown in Figure 3. The tubular member 42 (Figure 3) is not only rotatable but is also axially movable under conditions to be referred to, and such axial movement presses against the bottom 49 to transmit corresponding movement to the button 30 (Figure 8) and thus select the low and reverse gear shift rail 22 for operation. The biasing spring 33 not only normally holds the sleeve 27 in the position shown in Figure 8, but also acts through the button 30, Bowden wire 31 and button 49 to normally hold the crank arm 46 in the position shown in Figure 3.

In the manually shiftable mechanism, for certain parts of which the present construction is substituted in a manner to be described, a handle is provided adjacent the steering wheel for effecting axial movement of the tube 42 to select one shift rail for operation and for rocking the member 42 on its axis to actuate the selected shift rail. Such handle is necessarily long and relatively heavy in order to possess the necessary strength and to provide the necessary leverage for effecting the necessary shifting operations. While the same handle may be employed with the present mechanism, it is much preferred that the handle illustrated in Figures 1 and 2 be employed since it is relatively light and simple in construction and may be materially shorter since its movement for shifting the selected shift rail is only a fraction of the distance of movement necessary in the manual shifting mechanism referred to.

Referring to Figures 1 and 2 the numeral 51 designates a housing carried by the steering column adjacent the steering wheel and provided at one side with an arcuate opening 52 at right angles to the axis of the steering column. A handle lever 53 may be provided with a ball 54 arranged in the opening 52 and pivotally connected as at 55 to the tubular member 42. Inasmuch as the end of the handle lever 53 adjacent its pivot 55 moves axially with respect to the steering column to axially move the member 42, the steering column section 34 is provided with a suitable opening 56 to permit such movement to take place. At its outer end, the lever 53 is provided with a handle indicated as a whole by the numeral 57 and comprising a flange portion 58 approximately parallel to the plane of the steering wheel and projecting slightly beyond the steering wheel. The handle 57 further includes a flange or finger piece 59 preferably formed integral with the flange 58 and arranged centrally of the width thereof. The flange 59 projects beyond the flange 58 to facilitate engagement with one of the operator's fingers therewith independently of the flange 58. This arrangement per se forms no part of the present invention but is described and claimed in the copending application of Henry W. Hey, Serial No. 196,084, filed March 15, 1938.

A motor is fixed with respect to the steering column for delivering power to actuate the crank 18 and thus move the selected shift rail. The motor is indicated as a whole by the numeral 60 and comprises a preferably drawn cylinder 61 having an integral cylinder head 62 on one end. The other head of the cylinder is indicated by the numeral 63 and preferably is in the form of a die casting integral with the cast section 38. Accordingly it will be apparent that the motor is effectively supported with respect to the steering column by a member which forms a portion of the connecting means between the two steering column sections 34 and 35. The head 63 is secured to the cylinder in any suitable manner and contains a valve mechanism similar to the corresponding mechanism shown in my copending application Serial No. 207,844, filed May 13, 1938.

Referring to Figures 4 and 6, the numeral 64 designates a bore in which is arranged a valve cylinder 65 provided adjacent opposite ends with ports 66 and 67 communicating respectively with pockets 68 and 69 formed in the cylinder head 63. A cap member 70 is secured against the end of the cylinder head 63 in which the valve mechanism is arranged and forms a closure for the bore 64 and for a pocket 71 formed in the cylinder head 63 as shown in Figures 4 and 6.

A cylindrical valve 72 is slidable in the valve cylinder 65 and is provided intermediate its ends with a reduced portion 73 forming a vacuum passage which is in constant communication with the pocket 71 through a slot 74 formed in the valve cylinder 65. The valve 72 is adapted to be actuated through the medium of a crank arm 75 mounted upon a shaft 76 extending through one wall of the cylinder head 63 as shown in Figure 6 and provided at its outer end with an operating crank 77. The crank arm 75 is provided at its inner end with a ball 78 engageable in a socket 79 formed in one side of the valve 72.

It will be apparent that when rocking movement is transmitted to the crank 77, the valve 72 will be moved axially. Movement of the valve in one direction connects the vacuum passage 73 of the valve to the port 66 while the port 67 communicates with the interior of the valve cylinder 65. Conversely, movement of the valve 72 in the other direction connects the vacuum passage 73 of the valve to the port 67 while the port 66 communicates with the interior of the valve cylinder. It will be noted that the cap 70 is provided with a passage 80 from which a port 81 leads into the pocket 71, and the passage 80 is connected by a pipe 82 to a flexible hose 83 leading to the intake manifold of the motor vehicle engine, or to any other source of non-atmospheric pressure.

The interior of the valve cylinder 65 is in constant communication with the atmosphere. The cap 70 is provided with an atmospheric passage 84 from which a port 85 leads into the adjacent end of the valve cylinder. The passage 84 is connected by a pipe 86 to a flexible hose 87 which preferably leads to the air cleaner of the engine carburetor (not shown). It will be apparent that the operation of the apparatus is in no sense dependent upon the connection of the pipe 87 to the air cleaner, and in fact, no air cleaner need be employed although its use is preferable.

The cylinder head 63 is provided with a lateral extension 88 in which is formed a passage 89 leading to a pipe 90, the end of this pipe being preferably pressed into an elastic nipple 91 arranged in the adjacent end of the port 89. The other end of the pipe leads to the opposite end of the cylinder 61 through a suitable connection 92.

A flexible diaphragm 93 is arranged between the cylinder head 63 and the adjacent end of the motor cylinder 61. The cylinder head 63 is provided with an annular flange 94 within which is formed a space 95 opening against the adjacent face of the diaphragm 93 and communicating with the pocket 68. It will be noted that the space 95 is substantially arcuate, it being noted that the cylinder head 63 is provided with an inner circular boss 96 having its face flush with the face of the flange 94. The flange 94 and boss 96 are connected by a web portion 97 which is approximately segmental in shape, as will become apparent.

A plate indicated as a whole by the numeral 98 is arranged against the inner face of the diaphragm 93 and comprises inner and outer ring portions 99 and 100 connected by a segmental web portion 101 which corresponds in shape to the web portion 97 between the flange 94 and boss 96. The arcuate space between the inner and outer ring portions 99 and 100 and terminating at the edges of the web portion 101 determines the area of the inner face of the diaphragm 93 which is open to the adjacent end of the cylinder 61, and such face of the diaphragm is exactly equal in area to the opposite face of the diaphragm which is exposed to the space 95.

The inner face of the diaphragm is affected by pressures in the adjacent end of the cylinder while the same area of the other face of the diaphragm is affected by pressures connected to the opposite end of the cylinder through the space 68, passage 89 and pipe 90. The plate 98 is rigidly secured against the diaphragm and to the flange 94 and boss 96 and the edges of the plate may be slightly turned away from the diaphragm as at 102 to prevent any sharp edges of the plate from contacting with the diaphragm. In the arcuate space between the inner and outer ring members 99 and 100 a stiffening plate 103 is secured to the diaphragm and has its edge portions turned inwardly as at 104 to render the plate 103 relatively rigid from end to end. This plate is connected substantially centrally of its length to a rod 105 extending into the pocket 71 and provided with a notch 106 receiving an arcuate member 107 carried by the crank arm 75. It will be apparent that differential pressure acting on opposite sides of the diaphragm 93 will transmit forces to the crank arm 75, and the purpose of this arrangement will be referred to later.

As previously stated the space 68 communicates with the remote end of the cylinder 61 through the passage 89 and pipe 90. The pocket 69 communicates with the adjacent end of the cylinder 61 in the manner shown in Figure 7. The cylinder head 63 is provided with a web portion 108 in which is formed a port 109 communicating between the pocket 69 and the adjacent end of the cylinder 61 through an opening 110 formed in the diaphragm 93 and through a similar opening 111 formed in the web portion 101 of the plate 98 (see Figure 5).

A piston 112 is reciprocable in the cylinder 61 and is connected to a piston rod 113 slidable in a bearing 114 formed integral with the cylinder head 63. The lower end of the piston rod is notched as at 115 to receive the rounded end 116 of a lever 117, the piston rod and its connection with the lever 117 preferably being surrounded by an elastic boot 117' to minimize the entrance of foreign material into the bearing for the piston rod. The lever 117 is pivotally connected as at 118 on a boss 118' preferably formed integral with the section 38. The other end of the lever 117 is pivotally connected as at 119 to a yoke 120 carried by a link 121. The other end of this link is connected to one arm of a bell crank lever 122 and the other end of this bell crank lever is connected to the forward end of the rod 21.

The pivot pin 119 also passes through one end of a control lever 123 and the other end of this lever is connected by a rod 124 to the valve operating crank 77. Intermediate its ends the control lever 123 is pivotally connected to a rod 125 which extends through a slot 126 (Figure 2) formed in the lever 117. The upper end of the rod 125 is pivotally connected to the free end of the crank member 46, as shown in Figures 1 and 2. It will be apparent that the arrangement of the crank arm 46, levers 117 and 123 and the piston rod 113 are such as to provide a follow-up action of the valve 72 whereby movement of the piston takes place to an extent proportional to movement of the handle 57 parallel to the steering wheel.

A slightly modified form of the invention is shown in Figures 9 and 10 in which the motor valve mechanism, etc., are identical with the forms of these elements previously described, the only difference being in the control handle mechanism. The parts of the apparatus which are identical with the forms previously described have been indicated by the same reference numerals. Sections 127 and 128 are provided which may be identical with the sections 37 and 38 previously described although it will be apparent that since the handle mechanism is arranged externally of the steering column the latter is not divided into two sections and accordingly the opening 45 (Figure 3) may be eliminated. The section 127 may be provided with a laterally extending integral bearing member 129 rotatably supporting a tubular member 130, the upper end of this member being rotatably supported in a bearing member 131 carried by the steering column. The tube 130 is provided beneath the bearing 129 with a crank arm 132 to the free end of which is connected the rod 125 as in Figure 1.

A rod 133 is axially movable in the tube 120 and is slidable in a bearing element 134 clamped in a split support 135 formed integral with and projecting laterally from the supporting section 128. The lower end of the rod 133 is connected to the Bowden wire 31. The upper end of the rod 133 is provided with a knob or ball 136.

An actuating member 137 is arranged above the bearing bracket 131 and is provided with a lower flange member 138 resting thereon. The member 137 is provided with a laterally extending portion 138 of inverted U-shape in cross section and a handle lever 139 is pivoted within the extended portion 138 as at 140. The outer end of the lever 139 is provided with a handle 141 which may be identical in construction and arrangement with the handle 57 previously described. The inner end of the lever 139 is provided with a slot 142 through which extends the reduced upper end 143 of the rod 133, and the ball 136 is arranged in a longitudinal opening 144 formed in the inner end of the handle lever 139. It will be apparent that rocking movement of the lever 139 on its pivot 140 moves the rod 133 axially in the tube 130 to select either shift rail for operation, and that movement of the lever 139 parallel to the steering wheel turns the tube 130 and thus actuates the crank 132, this action controlling the valve mechanism, as will be described.

The principal distinction between the form of the invention shown in Figures 9 and 10 and the form previously described therefore lies in the arrangement of the manually operable mechanism externally of the steering column. If desired, the modified form of the invention may be slightly simplified by omitting the bell crank lever 122, in which case a rod 145 will be directly connected at one end to the pivot 119 and at its other end to the pivot 19 of the crank 18.

The operation of the apparatus is as follows:

Referring to Figure 8 it will be noted that the spring 33 biases the sleeves 27 to a position in engagement with the adjacent bearing 16, in which case the button 30 will occupy the position shown in Figure 8 and the button 49 will occupy the position shown in Figure 3 with the crank arm 46 engaging the upper edge of the opening 45. Therefore, it will be apparent that the sleeve 42 will be in its upper position and the handle 57 will be in its lower position. It also will be apparent that the finger 26 (Figure 8) will be in engagement with the notch 25 and accordingly the second and high gear shift rail 23 will be selected for operation upon actuation of the shifting motor 60. Assuming that the handle 57 is in neutral position and it is desired to shift into low gear, the operator will disengage the vehicle clutch and then engage one finger beneath the flange 58 to move it toward the steering wheel. This action moves the sleeve 42 (Figure 3) axially downwardly whereupon the crank 46 pushes against the button 49 and transmits movement through the Bowden wire 31 and button 30 (Figure 8) to move the sleeve 27 against the tension of the spring 33. Accordingly the finger 26 will be moved out of the notch 25 into the notch 24 of the low and reverse gear shift rail 22.

The operator may then exert pressure against the flange 59 to move the handle downwardly and rearwardly parallel to the plane of the steering wheel while holding the handle in its previously described position toward the steering wheel. This movement of the handle 57 rocks the tube 42 in a direction to swing the lever 46 in a counter-clockwise direction in Figure 1, that is, looking from the lower end of the steering column. This action pulls upwardly on the rod 125 the lower end of which has lost motion connection with the lever 117 (Figure 2). The movement of the rod 125 swings the control lever 123 in a clockwise direction about its pivot 119, it being apparent that this pivot, under the conditions being described, is stationary. The other end of the lever 123 will move upwardly and will transmit corresponding movement to the rod 124 and the upper end of this rod will turn the crank 77 in a counter-clockwise direction as viewed in Figure 4. This movement actuates the valve 72 to initially connect the vacuum passage 73 to the port 67 while maintaining the port 66 in communication with the atmosphere through the valve 72. The port 67 leads to the pocket 69 which communicates in turn with the adjacent end of the cylinder through the port 109 (Figure 7) and accordingly air will be exhausted from beneath the piston 112 while the space above the piston will be maintained at atmospheric pressure.

The piston 112 thus will start to move downwardly and will turn the lever 117 about its fixed pivot 118, and this action moves the outer end of the lever 117 upwardly. In other words, the lever 117 turns in a counter-clockwise direction about its pivot 118 to pull upwardly on the link 121, turn the bell crank lever 122 in a clockwise direction and turn the crank 18 in a similar direction. Under such conditions, the finger 26 (Figure 8) will move forwardly or to the left as viewed in Figure 8 and the shift rail 22 will be moved toward low gear position.

From the foregoing it will be apparent that the operations described will take place upon upward movement of the rod 125 (Figure 1) and the corresponding end of the lever 117 similarly moves upwardly thus preventing the lower end of the rod 125 from taking up the lost motion provided through the medium of the slot 126 (Figure 2). The upward movement of the pivot pin 119 effected by upward movement of the adjacent end of the lever 117 is transmitted to the corresponding end of the control lever 123 by the pivot pin 119, thus tending to reverse the turning movement of the lever 123 as imparted thereto by the manually effected upward movement of the rod 125. This provides a follow-up action of the valve 72 by means of which the latter, upon being initially moved in the manner previously described, will remain axially offset from its neutral position to connect the lower end of the cylinder 61 to the intake manifold, but the valve 72 will not continue its movement in the direction referred to in view of the tendency for the pivot pin 119, upon being moved upwardly, to reverse the movement of the valve 72.

When the low gear position of the handle 57 is reached, movement of the handle will be arrested whereupon the crank arm 46 will cease to turn and the lower end of the rod 125 will become stationary. A slight additional movement of the motor piston in a downward direction moves the pivot pin 119 a slight additional distance upwardly and since the lower end of the rod 125 will now be stationary, the left hand end of the lever 123 will move downwardly to restore the valve 72 to its neutral position and there will be no further operation of the motor piston 112, pressures being balanced on opposite sides thereof.

When the vehicle has been accelerated to the desired speed in low gear, the clutch may be disengaged, whereupon the handle 57 will be moved upwardly and forwardly parallel to the plane of the steering wheel until neutral position is reached. Such movement of the handle 57 rotates the tube 42 to turn the crank arm 46 downwardly, and with the pivot pin 119 stationary prior to operation of the shifting motor, the inner end of the lever 123 will be moved downwardly. Such movement will be transmitted through the link 124 to the crank 77 (Figure 4) to swing this member downwardly and thus operate through the crank 75 to move the valve 72 upwardly. Under such conditions the vacuum passage 73 will be connected to the port 66, leading to the upper end of the cylinder 61 through pocket 68, passage 89 and pipe 90, while the port 67 will hold the lower end of the cylinder 61 in communication with the atmosphere through the passage 84, the lower end of the valve cylinder 65, pocket 69 and passage 109 (Figure 7).

Under such conditions the piston 112 will start to move upwardly from its lower position toward the center of the cylinder and the piston rod 113 will move upwardly to turn the lever 117 in a clockwise direction about its pivot 118 and thus move the outer end of the lever 117 downwardly. This is the same direction of movement as is imparted to the lever 123 by the rod 125, and accordingly the latter will not take up the lost motion provided by the slot 126 (Figure 2). Downward movement of the outer end of the lever 117 transmits similar movement to the rod 121 to turn the bell crank lever 122 in a counterclockwise direction. Similar movement is transmitted by the rod 21 to the crank 18, and the sleeve 27 will be turned to move the finger 26 to the right as viewed in Figure 8, thus moving the low and reverse gear shift rail toward neutral position.

When the neutral position of the parts are reached, movement of the handle parallel to the plane of the steering wheel will be arrested, whereupon the lower end of the rod 125 will become stationary and a slight additional downward movement of the outer end of the lever 17 will turn the lever 123 about the lower end of the rod 125 to move the rod 124 upwardly and thus swing the crank 117 a sufficient distance to cause the crank 75 (Figure 4) to return the valve 72 to normal position. Pressures will then be equalized on opposite sides of the piston 117 and movement thereof will be arrested.

It will be apparent that when the initial shift was made toward low gear position, the finger 26 in Figure 8 will have been engaged in the notch 24 and as soon as the finger 26 moved out of neutral position, the operator will have been permitted to release the pressure exerted beneath the flange 58 since the finger 26 will be held in engagement with the notch 24 by riding on the adjacent edge of the shift rail 23. When the shift is made back to neutral position, the same thing is true, and without any attention on the part of the operator, it merely is necessary for him to stop the movement of the handle 57 momentarily in the neutral position. When such position is reached the notches 24 and 25 will come into alignment with each other whereupon the spring 33 will move the sleeve 27 to the position shown in Figure 8, the finger 26 promptly being transferred from the notch 24 to the notch 25 ready for the shift into second gear.

Assuming that the parts are thus in neutral position with the finger 26 in engagement with the notch 25, the operator will continue to move the handle 57 upwardly and forwardly parallel to the plane of the steering wheel, under which conditions the operation of the valve, motor, etc., will be identical with the operation when shifting from first gear to neutral except that the finger 26 will be arranged in the notch 25. Accordingly the motor 60 will operate to turn the crank 18 in a counter-clockwise direction and accordingly the finger 26 will move the shift rail 23 into second gear. When the second gear position is reached, movement of the handle 57 will be arrested, whereupon a slight additional movement of the motor piston 112 will restore the valve 72 to its neutral position in exactly the same manner as when the parts were returned to and stopped in neutral position when moving to such position from low gear.

The vehicle clutch then may be engaged and the vehicle accelerated in second gear to the desired speed, whereupon the shift may be made into high gear by disengaging the vehicle clutch and moving the handle 57 downwardly and rearwardly parallel to the plane of the steering wheel without exerting any force on the handle to move it toward the steering wheel. Under such conditions, the finger 26 will remain in engagement with the notch 25 and the motor 61 will operate in the same manner as for the previously described shifting operation from neutral into low gear, the piston 112 moving downwardly in the cylinder 61 and the crank 18 being turned in a clockwise direction as viewed in Figure 1 to move the shift rail 23 toward the left as viewed in Figure 8. Since the shift rail 23 is both the second and high gear shift rail, it is not necessary to arrest movement of the handle 57 in neutral position and the movement of this handle may be continued straight through from the second gear to the high gear position. When the latter position is reached, movement of the handle 57 will be arrested whereupon a slight additional downward movement of the piston 112 will return the valve 72 to its neutral position in the same manner as described above in connection with the low gear position.

The shift into reverse gear takes place in exactly the same manner as for second gear except that the handle 57 will be pulled toward the steering gear in order to effect movement of the finger 26 into engagement with the notch 24 in the manner described above in connection with the shift into low gear. This operation having been performed, the operator may hold the handle in its position toward the steering wheel and move it upwardly and forwardly parallel to the plane of the steering wheel and thus effect the shift into reverse gear. As soon as the finger 26 is moved out of the neutral position, the operator may release the pressure exerted on the handle 57 toward the steering wheel since, as described in connection with the shift into low gear, the finger 26 cannot be released from the notch 24 until the parts are returned to their neutral position.

Referring to Figure 4 it will be noted that when the crank 77 is moved downwardly through the operation of the handle 57, the valve 72 will be moved upwardly and such operation connects the pocket 68 to the vacuum passage 73, and accordingly vacuum will be established in the space 95 beneath the diaphragm 93 as well as in the upper end of the motor. At the same time, atmospheric pressure will be established below the piston 112 and above the diaphragm 93 and accordingly opposite faces of the diaphragm will be subjected to differential pressures tending to move the diaphragm downwardly. This force is transmitted through the stem 105 to the crank arm 75 to oppose upward movement of this crank. Similarly, when the crank 75 is moved downwardly, a vacuum will be established above the diaphragm 93 while the space 95 below the diaphragm will be connected to the atmosphere and an upward force will be transmitted through the stem 105 to oppose downward movement of the crank 75.

Accordingly it will be apparent that any movement of the handle 57 which establishes differential pressures on opposite sides of the piston 112 will be opposed by pressures acting on the diaphragm 93. Because of the use of the plate 98 (Figures 4 and 5) and the engagement of the diaphragm with the correspondingly shaped portions of the cylinder head 63, only a portion of the diaphragm is free to move under the influence of differential pressures. Accordingly the pressures affecting the diaphragm 93 will be materially less than the pressures affecting the piston 112 but will be directly proportional thereto.

The pressures affecting the piston 112 will depend to a large extent upon the resistance encountered in the various shifting operations. During the portion of the travel of the piston in which the selected shift rail moves substantially without resistance, the piston 112 will move freely under slight differential pressure conditions, and the same conditions will be reproduced on opposite sides of the diaphragm 93 to correspondingly slightly resist movement of the handle 57. When movement of the piston 112 is resisted, as when releasing the spring detents usually associated with the shift rails, and when encountering the synchronizing clutches of the transmission, the piston movement will be immediately retarded and differential pressures will be immediately increased on opposite sides of the piston 112. This is due to the fact that air will continue to be exhausted from the side of the piston toward which the piston is moving and the piston will not move sufficiently rapidly to reduce the volume of the corresponding end of the cylinder to an extent commensurate with the rate of exhaustion of the air. Moreover, the follow-up action of the valve 72 provided by the piston will be reduced because of the retarded movement of the piston, and movement of the handle 57 will increase the opening of the ports controlled by the valve 72 to increase the rate of admission of air into one end of the cylinder and to increase the rate of exhaustion of air from the other end of the cylinder.

Accordingly it will be apparent that immediately upon the encountering of resistance by the piston in performing any shifting operation, there will be an instantaneous increase in differential pressures on opposite sides of the piston and consequently on opposite sides of the diaphragm 93. Under such conditions the diaphragm 93 will offer increased resistance to the movement of the crank 75 and this increased resistance is felt by the operator in moving the handle 57. Accordingly the handle is provided with a highly desirable "feel" which is directly proportional to the resistance encountered in the various shifting operations, and thus the manual shifting of the gears is accurately simulated.

The operation of the form of the invention shown in Figures 9 and 10 is substantially identical with the operation previously described and need not be referred to in detail. Movement of the handle 141 parallel to the plane of the steering wheel rocks the tube 130 to turn the crank 132 and the resulting operation is identical with the operation which takes place upon rocking the tube 42, as previously described. Movement of the handle 141 toward and at right angles to the plane of the steering wheel exerts a downward force on the rod 133 to select the low and reverse gear shift rail for operation, this operation being exactly the same as that previously described when the crank member 46 exerts a downward force on the pin 49.

While the connection between the lever 117 and the crank 18 in Figure 9 is not as desirable as the connecting means shown in Figure 1, it is cheaper to manufacture and simpler to install since it reduces the number of parts employed and eliminates the necessity for rotatably supporting the bell crank lever 122. Instead of the rods 21 and 121 and the bell crank lever 122 the outer end of the lever 117 is directly connected to the crank 18 by the rod 145. Downward and rearward movement of the pivot pin 119 transmits rearward movement to the crank 18, while upward and forward movement of the pivot pin 119 transmits forward movement to the crank 18. The connections between the rod 145 and the crank 18 and pivot pin 19 are sufficiently loose to compensate for the slightly different directions of movement of the pin 119 and lever 18.

From the foregoing it will be apparent that the present construction possesses numerous advantages over the structure of my copending application referred to above, and over any other prior structures of which I am aware. For example, the motor and control valve mechanism therefor, the power transmitting and follow-up means, and the manually operable portion of the mechanism are all supported by the rigid steering column of the vehicle, and this arrangement results in two very distinct advantages. In the first place, and most important, the supporting of all of the parts referred to by the single rigid steering column prevents any relative movement between the parts except movement which is intended, such as the operation of certain of the parts by the handle 57 and the operation of other parts by the motor. Therefore, regardless of any relative movement which takes place between any of the motor vehicle parts, the accuracy of operation of the present apparatus will be wholly unaffected.

In the second place, the present installation is highly advantageous for use in automobile structures wherein there is insufficient space at either side of the gear set for the installation of the motor or any of the parts associated therewith. In the third place, it will be noted that the assembly of the parts with respect to the steering column is particularly compact and ingenious. The motor is arranged to one side of the steering column, and the operating link 124 at the opposite side. The crank 77, for operating the valve mechanism, is arranged above the steering column, while the levers 117 and 123 are arranged below the steering column. Thus to provide a particularly compact and ingenious arrangement, the parts of the mechanism are arranged in surrounding relationship with respect to the steering column, thus minimizing the space required for the mechanism as a whole.

It is additionally noted that the mechanism possesses a further highly practical advantage in that it very readily may be substituted for portions of manually operable mechanisms for shifting motor vehicle gears wherein the shift lever is arranged beneath the steering column, it being wholly practicable for any mechanic of ordinary skill to make the necessary substitution of parts to change over from a manually operated mechanism to a power operated mechanism. In one such installation, for example, the free end of the lever 46 (Figure 1) is directly connected by a link to the upper arm of the bell crank lever 122. The present mechanism may be substituted for mechanisms of such type by removing the link between the levers 46 and 122 and substituting the parts shown in Figure 1. It is not essential, of course, that the motor head 63 be made integral with the supporting section 38. This is preferred in factory-equipped installations, but for installations as an accessory, the head 63 may be bolted or otherwise secured to the supporting section 38, thus facilitating the substitution of the present apparatus for a manual shifting mechanism of the type referred to.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. In combination with a motor vehicle having a steering column provided with a steering wheel at its upper end, and a transmission provided with a shiftable transmission operating member movable from a neutral position to different transmission setting positions, a motor supported by the steering column and connected to actuate said shiftable member, control mechanism of the follow-up type for said motor supported by said motor, and a control handle supported by the steering column adjacent the steering wheel and connected to operate said control mechanism.

2. In combination with a motor vehicle having a steering column provided with a steering wheel at its upper end, and a transmission provided with a shiftable transmission operating member movable from a neutral position to different transmission setting positions, a motor supported by the steering column, motion transmitting connections between said motor and said shiftable member, a manually operable handle supported by the steering column adjacent the steering wheel, control mechanism of the follow-up type for said motor supported by said motor, and follow-up means connecting said control mechanism to said handle and to said motion transmitting means whereby said motor effects movement of said shiftable member to an extent proportional to the distance of movement of said handle.

3. In combination with a motor vehicle having a steering column provided at its upper end with a steering wheel, and a transmission having a plurality of transmission operating members each shiftable from a neutral position into different transmission setting positions, a manually operable mechanism supported by the steering column and provided with an operating handle adjacent the steering wheel, means operable upon one movement of said manually operable mechanism for selecting either of said shiftable members for actuation, a motor supported by said steering column and connected to actuate the selected shiftable member, and control mechanism of the follow-up type for said motor supported thereby and connected to be operated by a different movement of said manually operable mechanism.

4. In combination with a motor vehicle having a steering column provided at its upper end with a steering wheel, and a transmission having a plurality of transmission operating members each shiftable from a neutral position into different transmission setting positions, a manually operable mechanism supported by the steering column and provided with an operating handle adjacent the steering wheel, means operable upon one movement of said manually operable mechanism for selecting either of said shiftable members for actuation, a motor supported by said steering column, motion transmitting means connecting said motor to the selected shiftable member to move the latter upon actuation of said motor, control mechanism for said motor, and follow-up means connecting said control mechanism to said motion transmitting connections and to said manually operable mechanism whereby, upon actuation of said motor, the selected member will be moved to an extent proportional to the extent of a different movement of said manually operable mechanism.

5. In combination with a motor vehicle having a steering column provided at its upper end with a steering wheel, and a transmission having a plurality of transmission operating members each shiftable from a neutral position into different transmission setting positions, a manually operable mechanism supported by the steering column, a handle arranged adjacent the steering wheel and connected to said mechanism, said handle being movable in one direction to effect one movement of said manually operable mechanism and being movable in another direction to effect a different movement of such mechanism, means having a portion supported by the steering column for utilizing said first named movement of said manually operable mechanism for selecting either of said shiftable members for actuation, a fluid pressure motor carried by the steering column and connected to effect movement of the selected shiftable member, and control valve mechanism of the follow-up type carried by said motor connected to said manually operable mechanism to be operated during the second named movement thereof.

6. In combination with a motor vehicle having a steering column provided at its upper end with a steering wheel, and a transmission having a plurality of transmission operating members each shiftable from a neutral position into different transmission setting positions, a manually operable mechanism supported by the steering column, a handle arranged adjacent the steering wheel and connected to said mechanism, said handle being movable in one direction to effect one movement of said manually operable mechanism and being movable in another direction to effect a different movement of such mechanism, means having a portion supported by the steering column for utilizing said first named movement of said manually operable mechanism for selecting either of said shiftable members for actuation, a fluid pressure motor carried by the steering column, motion transmitting connections between said motor and the selected shiftable member, a follow-up control valve mechanism for said motor, and follow-up means for operating said valve connected to said motion transmitting connections and to said manually operable mechanism to be actuated during the second named movement thereof whereby the selected shiftable member will be moved to an extent proportional to the extent of the second named movement of said handle.

7. In combination with a motor vehicle having a steering column provided at its upper end with a steering wheel, and a transmission having a plurality of transmission operating members each shiftable from a neutral position into different transmission setting positions, a power unit supported by the steering column and comprising a motor, a control device therefor, operating means for said control device, and a power take-off device, such elements of said unit being arranged in surrounding relationship to said steering column, a manually operable mechanism supported by the steering column, means connected to utilize one movement of said manually operable mechanism for selecting either of said shiftable members for operation, means connected between said power take-off device and the selected shiftable member to actuate the latter upon operation of said motor, and means connected to transmit a different movement of said manually operable mechanism to the operating means for said control device to operate said motor.

8. In combination with a motor vehicle having a steering column provided at its upper end with a steering wheel, and a transmission having a plurality of transmission operating members each shiftable from a neutral position into different transmission setting positions, a power unit supported by the steering column and comprising a motor, a control device therefor, operating means for said control device, and a power take-off device, such elements of said unit being arranged in surrounding relationship to said steering column, a manually operable mechanism supported by the steering column, means connected to utilize one movement of said manually operable mechanism for selecting either of said shiftable members for operation, means connected between said power take-off device and the selected shiftable member to actuate the latter upon operation of said motor, means connected to transmit a different movement of said manually operable mechanism to the operating means for said control device to operate said motor, and follow-up means connected to be operated upon actuation of said motor to cause said motor to effect movement of the selected shiftable member to an extent proportional to the degree of the last mentioned movement of said manually operable mechanism.

9. In combination with a motor vehicle having a steering column provided at its upper end with a steering wheel, and a transmission having a plurality of transmission operating members each shiftable from a neutral position into different transmission setting positions, a support fixed to the steering column, a motor carried by said support, control mechanism of the follow-up type for said motor having a portion fixed with respect to a portion of said motor, a manually operable mechanism supported by the steering column and mounted to partake of movements in two directions, means connected to utilize one movement of said manually operable mechanism for selecting one of said shiftable members for operation, motion transmitting means connecting said motor to the selected shiftable member to effect movement thereof, and means connected to transmit the other movement of said manually operable mechanism to said control mechanism to operate said motor.

10. In combination with a motor vehicle having a steering column provided at its upper end with a steering wheel, and a transmission having a plurality of transmission operating members each shiftable from a neutral position into different transmission setting positions, a support fixed to the steering column, a motor carried by said support, control mechanism of the follow-up type for said motor having a portion fixed with respect to a portion of said motor, a manually operable mechanism supported by the steering column and mounted to partake of movements in two directions, means connected to utilize one movement of said manually operable mechanism for selecting one of said shiftable members for operation, motion transmitting means connecting said motor to the selected shiftable member to effect movement thereof, and follow-up control means connecting said control mechanism to said manually operable mechanism and to said motion transmitting means whereby the motor will move the selected shiftable member to an extent proportional to the extent of the other movement of said manually operable mechanism.

11. In combination with a motor vehicle having a steering column provided at its upper end with a steering wheel, and a transmission having a plurality of transmission operating members each shiftable from a neutral position into different transmission setting positions, a handle supported by the steering column and mounted for movement toward or away from the steering wheel and for movement parallel to the plane of the steering wheel, means connected for utilizing the first named movement of said handle for selecting either of said shiftable members for operation, a motor supported by the steering column, motion transmitting connections between said motor and the selected shiftable member, and means of the follow-up type having a portion carried by a portion of said motor and connected to utilize the second named movement of said handle for controlling said motor.

12. In combination with a motor vehicle having a steering column provided at its upper end with a steering wheel, and a transmission having a plurality of transmission operating members each shiftable from a neutral position into different transmission setting positions, a handle supported by the steering column and mounted for movement toward or away from the steering wheel and for movement parallel to the plane of the steering wheel, means connected for utilizing the first named movement of said handle for selecting either of said shiftable members for operation, a motor supported by the steering column, motion transmitting connections between said motor and the selected shiftable member, means carried by the steering column and connected to utilize the second named movement of said handle for controlling said motor, and follow-up connections carried by the steering column and controlled by operation of said motor and by said last named means for causing said motor to move the selected shiftable member to an extent proportional to the extent of the second named movement of said handle.

13. In combination with a motor vehicle having a steering column provided at its upper end with a steering wheel, and a transmission having a plurality of transmission operating members each shiftable from a neutral position into different transmission setting positions, a handle supported by the steering column and mounted for movement toward or away from the steering wheel and for movement parallel to the plane of the steering wheel, means for utilizing the first named movement of said handle for selecting one of said shiftable members for operation, a member supported by the steering column and connected to said handle to be rocked upon movement of the handle parallel to the plane of the steering wheel, a crank carried by such member, a motor carried by the steering column, motion transmitting connections between said motor and the selected shiftable member, a control mechanism of the follow-up type for said motor carried by the steering column, and follow-up means carried by the steering column and connecting said control mechanism to said crank and to said motion transmitting connections to cause said motor to move the selected shiftable member to an extent proportional to the extent of movement of said handle.

14. In combination with a motor vehicle having a steering column provided at its upper end with a steering wheel, and a transmission having a plurality of transmission operating members each shiftable from a neutral position into different transmission setting positions, a handle supported by the steering column and mounted for movement at right angles to the plane of the steering wheel and for movement parallel to such plane, means for utilizing the first named movement of said handle for selecting either of said shiftable members for operation, a motor unit supported by the steering column, said unit comprising a differential fluid pressure operated motor, control valve mechanism therefor and a pressure responsive member influenced by pressures in opposite ends of said motor, motion transmitting means connecting said motor to the selected shiftable member, means for operating said control valve mechanism upon movement of said handle parallel to the plane of the steering wheel, and means connected to said pressure responsive member for resisting movement of said handle parallel to the plane of the steering wheel to a degree proportional to resistances encountered by said motor in moving the selected shiftable member.

15. In combination with a motor vehicle having a steering column provided at its upper end with a steering wheel, and a transmission having a plurality of transmission operating members each shiftable from a neutral position into different transmission setting positions, a handle supported by the steering column and mounted for movement at right angles to the plane of the steering wheel and for movement parallel to such plane, means for utilizing the first named movement of said handle for selecting either of said shiftable members for operation, a motor unit supported by the steering column, said unit comprising a differential fluid pressure operated motor, control valve mechanism therefor and a pressure responsive member influenced by pressures in opposite ends of said motor, motion transmitting means connecting said motor to the selected shiftable member, follow-up control means connecting said valve mechanism to said handle and to said motion transmitting means whereby said motor will move the selected shiftable member to an extent proportional to movement of said handle parallel to the plane of the steering wheel, and means connected to said pressure responsive member for resisting the last mentioned movement of said handle to an extent proportional to the resistance encountered by said motor in moving the selected shiftable member.

16. In combination with a motor vehicle having a steering column provided at its upper end with a steering wheel, and a transmission having a plurality of transmission operating members each shiftable from a neutral position into different transmission setting positions, a control member mounted in the steering column for rocking and axial movement, a handle supported by the steering column adjacent the steering wheel and differently movable to effect the respective movements of said control member, means for utilizing axial movement of said control member for selecting either shiftable member for operation, a support secured to the steering column, a motor carried by said support, motion transmitting connections between said motor and the selected shiftable member for moving the latter, a follow-up control mechanism for said motor carried by the steering column, and follow-up control means for said control mechanism carried by the steering column and connected to be operated by said motion transmitting connections and by rocking movement of said control member whereby said motor will move the selected shiftable member to an extent proportional to the extent of the rocking movement of said control member.

17. In combination with a motor vehicle having a steering column provided at its upper end with a steering wheel, and a transmission having a plurality of transmission operating members each shiftable from a neutral position into different transmission setting positions, a rocking member supported by the steering column in approximately parallel relationship thereto, a member axially movable in said rocking member, a handle arranged adjacent the steering wheel and connected to said rocking member and said axially movable member whereby movement of said handle at right angles to the steering wheel will move said axially movable member while movement of said handle parallel to the plane of the steering wheel will rock said rocking member, means for utilizing movement of said axially movable member for selecting either shiftable member for actuation, a motor supported by the steering column, motion transmitting means connecting said motor to the selected shiftable member, a crank connected to said rocking member, a control mechanism for said motor, and a follow-up mechanism connecting said control mechanism to said crank and to said motion transmitting connections whereby said motor will move the selected shiftable member to an extent substantially proportional to the extent of movement of said handle parallel to the plane of the steering wheel.

18. In combination with a motor vehicle having a steering column provided at its upper end with a steering wheel, and a transmission having a plurality of transmission operating members each shiftable from a neutral position into different transmission setting positions, a manually operable mechanism supported by the steering column and provided with an operating handle adjacent the steering wheel, means operable upon one movement of said manually operable mechanism for selecting either of said shiftable members for actuation, a motor supported by said steering column, motion transmitting means connecting said motor to the selected shiftable member to move the latter upon actuation of said motor, control mechanism for said motor, and follow-up means connected to be responsive to operation of said manually operable mechanism upon a different movement thereof, and to operation of said motor, whereby the selected shiftable member, upon actuation of said motor, will be moved to an extent proportional to the extent of said different movement of said manually operable mechanism.

19. In combination with a motor vehicle having a steering column provided at its upper end with a steering wheel, and a transmission having a plurality of transmission operating members each shiftable from a neutral position into different transmission setting positions, a manually operable mechanism supported by the steering column, a handle arranged adjacent the steering wheel and connected to said mechanism, said handle being movable in one direction to effect one movement of said manually operable mechanism and being movable in another direction to effect a different movement of such mechanism, means having a portion supported by the steering column for utilizing said first named movement of said manually operable mechanism for selecting either of said shiftable members for actuation, a fluid pressure motor carried by the steering column and connected to effect movement of the selected shiftable member, and a follow-up control valve mechanism for said motor having a portion fixed with respect to a portion of said motor, and follow-up means controlled by operation of said motor and by said manually operable mechanism upon said second named movement of said handle for causing said motor to move the selected shiftable member to an extent proportional to the extent of the second named movement of said handle.

20. In combination with a motor vehicle having a steering column provided at its upper end with a steering wheel, and a transmission having a plurality of transmission operating members each shiftable from a neutral position into different transmission setting positions, a handle supported by the steering column and mounted for movement toward or away from the steering wheel and for movement parallel to the plane of the steering wheel, means for utilizing the first named movement of said handle for selecting one of said shiftable members for operation, a member supported by the steering column and connected to said handle to be rocked upon movement of the handle parallel to the plane of the steering wheel, a crank carried by such member, a motor carried by the steering column, motion transmitting connections between said motor and the selected shiftable member, a control mechanism for said motor carried by the steering column, and follow-up control means for said control mechanism carried by the steering column and responsive to operation of said crank and to operation of said motor to cause the latter to move the selected shiftable member to an extent proportional to the extent of movement of said crank by said handle.

21. In combination with a motor vehicle having a steering column provided at its upper end with a steering wheel, and a transmission having a plurality of transmission operating members each shiftable from a neutral position into different transmission setting positions, a control member mounted in the steering column for rocking and axial movement, a handle supported by the steering column adjacent the steering wheel and differently movable to effect the respective movement of said control member, means for utilizing axial movement of said control member for selecting either shiftable member for operation, a support secured to the steering column, a motor carried by said support, motion transmitting connections between said motor and the selected shiftable member for moving the latter, control mechanism for said motor carried by the steering column, and follow-up control means for said control mechanism carried by the steering column and connected to be responsive to operation of said motor and to rocking movement of said control member whereby said motor will move the selected shiftable member to an extent proportional to the extent of the rocking movement of said control member.

HENRY BAADE.